United States Patent
Trivedi

(10) Patent No.: US 9,396,023 B1
(45) Date of Patent: Jul. 19, 2016

(54) METHODS AND SYSTEMS FOR PARALLEL DISTRIBUTED COMPUTATION

(71) Applicant: QLOGIC, Corporation, Aliso Viejo, CA (US)

(72) Inventor: Hemant Trivedi, Cupertino, CA (US)

(73) Assignee: QLOGIC, Corporation, Aliso Viejo, CA (US)

(*) Notice: Subject to any disclaimer, the term of this patent is extended or adjusted under 35 U.S.C. 154(b) by 0 days.

(21) Appl. No.: 14/585,761

(22) Filed: Dec. 30, 2014

(51) Int. Cl.
*G06F 9/45* (2006.01)
*G06F 9/48* (2006.01)
*G06F 9/54* (2006.01)

(52) U.S. Cl.
CPC ............... *G06F 9/4881* (2013.01); *G06F 9/54* (2013.01)

(58) Field of Classification Search
CPC ........ G06F 9/52; G06F 9/4881; G06F 9/4843
USPC .......................................................... 718/106
See application file for complete search history.

(56) References Cited

U.S. PATENT DOCUMENTS

| | | | | |
|---|---|---|---|---|
| 8,862,933 B2* | 10/2014 | Manglik | ............... | G06F 9/5072 714/11 |
| 2013/0326534 A1* | 12/2013 | Gupta | ........................ | G06F 9/50 718/104 |
| 2013/0326538 A1* | 12/2013 | Gupta | ........................ | G06F 9/50 718/107 |
| 2015/0200867 A1* | 7/2015 | Dutta | .................. | H04L 49/3045 709/226 |
| 2015/0312335 A1* | 10/2015 | Ying | .................... | H04L 61/6077 709/201 |

* cited by examiner

*Primary Examiner* — John Chavis
(74) *Attorney, Agent, or Firm* — Klein, O'Neill & Singh, LLP

(57) ABSTRACT

Methods and systems for performing a shared computing task are provided. The method includes configuring a shared computing task among a plurality of computing nodes each executing an application for performing the shared computing task; generating intermediate data by each of the plurality of computing nodes during a mapping process for performing the shared computing task; capturing the intermediate data for each of the plurality of computing nodes; storing the intermediate data for each of the plurality of computing nodes at a key-value data store at a shared storage device that enables searching for the intermediate data using a key-value pair; and using the key-value pair to obtain the intermediate data when needed for a reduce process of the shared computing task.

20 Claims, 8 Drawing Sheets

METHODS AND SYSTEMS FOR PARALLEL DISTRIBUTED COMPUTATION

TECHNICAL FIELD

The present disclosure relates to parallel distributed computing.

BACKGROUND

A computer network, often simply referred to as a network, is a group of interconnected computers and devices that facilitates communication among users and allows users to share resources. Adapters, switches and other devices are typically used during network communication for reading and writing data at mass storage devices.

A cluster of computing system nodes may be used to perform complex computing tasks. Each computer node includes a processor complex and local storage devices. Each node is configured to perform a computing task and typically, each node uses its own storage for storing information. This approach is inefficient because the storage cannot be scaled independent of the compute layer and one is not able to leverage advanced storage capabilities. Continuous efforts are being made to separate the storage layer from the compute layer in parallel computing.

BRIEF DESCRIPTION OF THE DRAWINGS

The various present aspects disclosed herein will be discussed in detail with an emphasis on highlighting the advantageous features. These novel and non-obvious aspects are depicted in the accompanying drawings, which are for illustrative purposes only. These drawings include the following figures, in which like numerals indicate like parts.

DETAILED DESCRIPTION

Figure 1A:
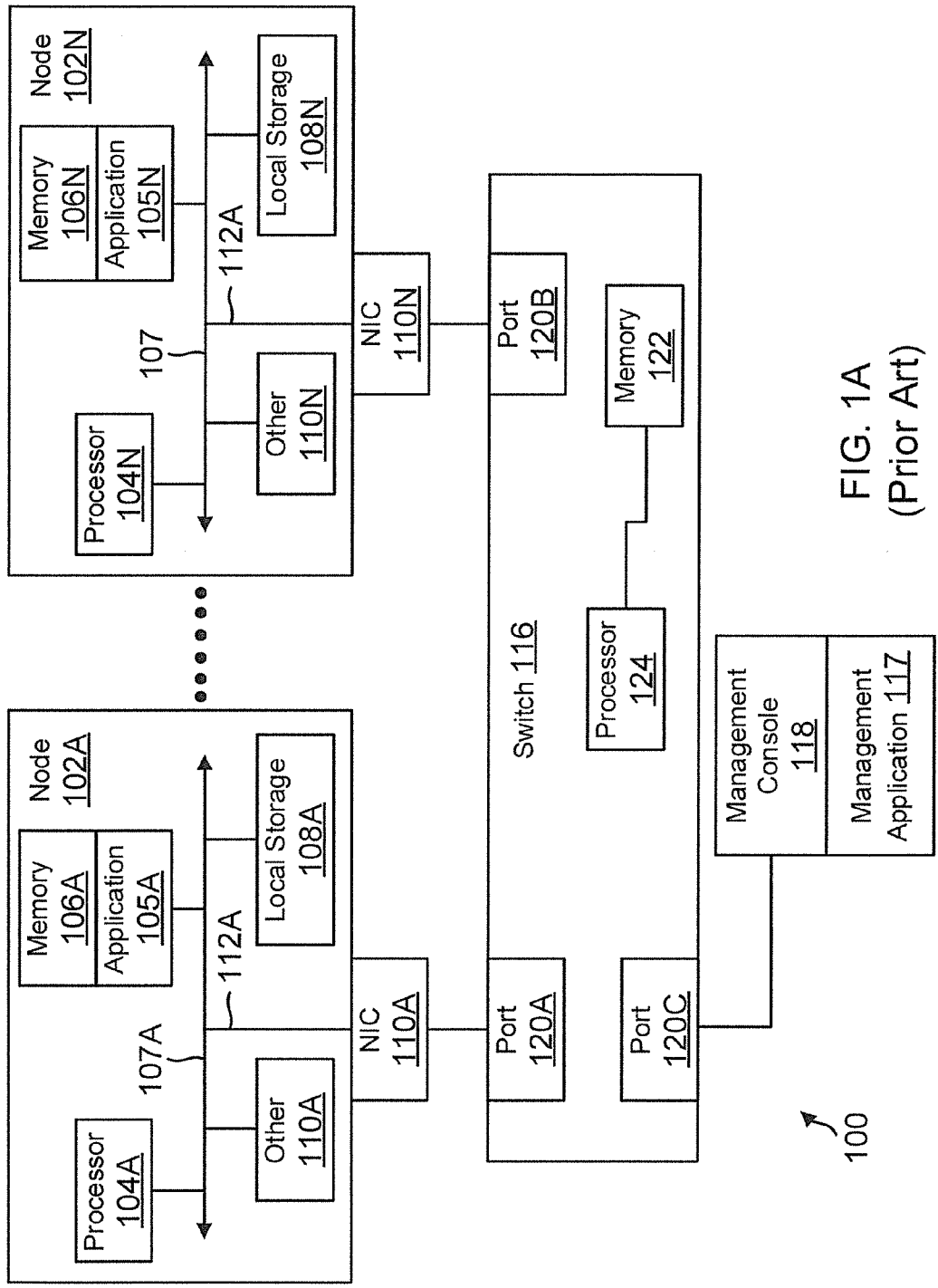
FIG. 1A shows a conventional cluster computing system.

The following detailed description describes the present aspects with reference to the drawings. In the drawings, reference numbers label elements of the present aspects. These reference numbers are reproduced below in connection with the discussion of the corresponding drawing features.

As a preliminary note, any of the aspects described with reference to the figures may be implemented using software, firmware, hardware (e.g., fixed logic circuitry), manual processing, or a combination of these implementations. The terms "logic," "module," "component," "system," and "functionality," as used herein, generally represent software, firmware, hardware, or a combination of these elements. For instance, in the case of a software implementation, the terms "logic," "module," "component," "layer," "system," and "functionality" represent executable instructions that perform specified tasks when executed on a hardware based processing device or devices (e.g., CPU or CPUs). The program code can be stored in one or more non-transitory, computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations. The term "machine-readable media" and the like refers to any kind of medium for retaining information in any form, including various kinds of storage devices (magnetic, optical, static, etc.).

The various aspects disclosed herein may be implemented as a computer process (method), a computing system, or as an article of manufacture, such as a computer program product or computer-readable media. The computer program product may be non-transitory, computer storage media, readable by a computer device, and encoding a computer program of instructions for executing a computer process. The computer program product may also be readable by a computing system, and encoding a computer program of instructions for executing a computer process.

System 100:

FIG. 1A is a block diagram of a clustered system 100 having a plurality of computing systems 102A-102N (which may also be referred to as node, server or host system 102) operating as computing nodes for performing parallel distributed computing. As an example, cluster 100 may be based on an Apache Hadoop Map-Reduce framework (referred to herein as the "Apache Hadoop Architecture"). The Apache Hadoop architecture provides a distributed file system for executing computing tasks in parallel, as described below in detail.

Each node may include one or more processors 104A-104N (may also be referred to as processor 104), also known as central processing units (CPUs). Processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices.

Processor 104 executes machine implemented instructions (or process steps/blocks) out of a memory 106A-106N (may also be referred to as memory 106) and interfaces with an interconnect 107A-107N (may also be referred to as 107) that may be referred to as a computer bus 107. The computer bus 107 may be, for example, a system bus, a Peripheral Component Interconnect (PCI) bus, PCI-Express (PCIe) bus, a HyperTransport or industry standard architecture bus, a SCSI bus, a universal serial bus (USB), an Institute of Electrical and Electronics Engineers (IEEE) standard 1394 bus (sometimes referred to as "Firewire"), or any other type of bus.

Each node may further include a local storage device 108A-108N (may also be referred to as storage 108), which may include, for example, a hard disk (HDD), a CD-ROM, a non-volatile memory device (flash or memory stick), a hybrid drive (sometimes referred to as SSHD), or any other storage device for storing structured or unstructured data. Storage 108 may store operating system program files (or data containers) and/or application program files, for example, email applications, database applications, management applications, and other applications. Some of these files are stored on storage 108 using an installation program. For example, the processor 104 may execute computer-executable process steps of an installation program so that the processor 104 can properly execute the application program.

Memory 106 also interfaces with the computer bus 107 to provide the processor 104 with access to memory storage. Memory 106 may include random access main memory (RAM). When executing stored computer-executable process steps from storage 108, the processor 104 may store and execute the process steps out of memory 106. Read only memory (ROM, not shown) may also be used to store invariant instruction sequences, such as start-up instruction sequences or basic input/output system (BIOS) sequences for operation of a keyboard (not shown).

Processor 104 may execute an application 105A-105N (may also be referred to as application 105) at each node for performing distributed parallel processing. Data produced by each application 105 is stored as intermediate data at local storage 108 and then provided to other nodes via NICs 110A-110N (may also be referred to as NIC 110). Each NIC is accessible to processor 104 via a link 112A-112N (may also be referred to as 112), for example, a PCI-Express (PCIe) link.

Each NIC 110 has a port (not shown) that is coupled to the ports of a switch 116 (for example, Port 120A and 120B). Switch 116 also includes or is coupled to a processor 124 and a memory 122 for executing switch firmware instructions for controlling overall switch 116 operations. Switch 116 also includes a port 120C that is coupled to a management console 118. The management console 118 executes a management application 117 that may be used to configure the various elements of system 100. As an example, the management console structure may be similar to a computing node 102 i.e. it includes a processor, a memory, local storage, a NIC and other components. Details of these components are not provided herein because they are not germane to the various adaptive aspects of the present disclosure.

Each node also includes other devices and interfaces 110A-110N (also referred to herein as 110), which may include a display device interface, a keyboard interface, a pointing device interface and others. The details of these components are not germane to the inventive aspects.

Storing intermediate data at the local storage device 108 of one node and then providing the intermediate data to other nodes can slow down the overall distributed computing tasks because the processor has to go through various disk reads and writes as described below in more detail with respect to FIGS. 3A-3B below. The architecture of FIG. 1B improves the overall processing of data in a clustered, distributed computing environment.

Figure 1B:
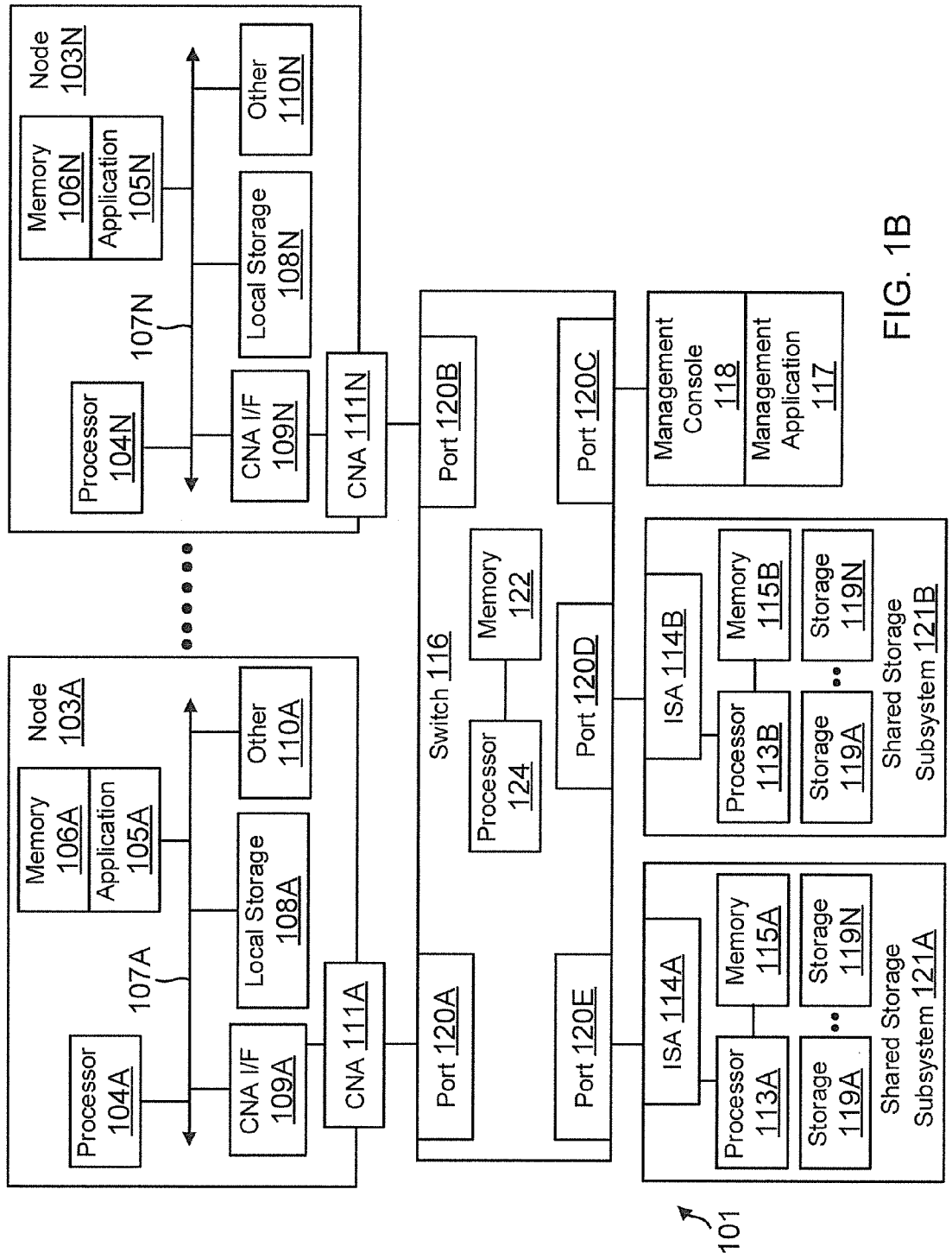
FIG. 1B is a functional block diagram of a system, according to one aspect of the present disclosure.

FIG. 1B shows an example of a system 101 with a plurality of computing nodes 103A-103N (may also be referred to as 103) coupled to the switch 116. Instead of NICs 110, each computing node has a converged network adapter (CNA) 111A-111N (may also be referred to as 111). A CNA can be configured to handle both storage and network traffic. Various network and storage protocols may be used to handle network and storage traffic, for example, Ethernet, Fibre Channel, Fibre Channel over Ethernet (FCoE), Internet over Small Computer System Interface (iSCSI), and others. Some of these common protocols are described below.

Ethernet is a common network protocol used for network communication. The original Ethernet bus or star topology was developed for local area networks (LAN) to transfer data at 10 Mbps (megabits per second). Newer Ethernet standards (for example, Fast Ethernet (100 Base-T) and Gigabit Ethernet) support data transfer rates that are greater than 1 gigabit (GB). The various aspects described herein may use Ethernet (which includes 100 Base-T and/or Gigabit Ethernet) as the network protocol. However, the adaptive aspects disclosed herein are not limited to any particular protocol, as long as the functional goals are met by an existing or new network protocol.

Fibre Channel (or "FC") is a common storage technology used in SANs. Fibre Channel is a set of American National Standards Institute (ANSI) standards that provide a serial transmission protocol for storage and network protocols such as HIPPI, SCSI, IP, ATM and others. Fibre Channel supports three different topologies: point-to-point, arbitrated loop and fabric. The point-to-point topology attaches two devices directly. The arbitrated loop topology attaches devices in a loop. The fabric topology attaches host systems directly (via HBAs) to a fabric, which are then connected to multiple devices. The Fibre Channel fabric topology allows several media types to be interconnected. Fibre Channel fabric devices include a node port or "N_Port" that manages Fabric connections. The N_port establishes a connection to a Fabric element (e.g., a switch) having a fabric port or F_port.

A new and upcoming standard, called Fibre Channel over Ethernet (FCOE) has been developed to handle both Ethernet and Fibre Channel traffic in a SAN. This functionality would allow Fibre Channel to leverage high speed, for example, 10 Gigabit Ethernet networks while preserving the Fibre Channel protocol. In one aspect, ISA 114A can be configured to operate as a FCOE adapter. Those of ordinary skill in the art will appreciate, however, that the present aspects are not limited to any particular protocol.

iSCSI is an IP-based storage networking standard for linking data storage facilities. By carrying SCSI commands over IP networks, iSCSI is used to facilitate data transfers over intranets and to manage storage over long distances. iSCSI can be used to transmit data over local area networks (LANs), wide area networks (WANs), or the Internet and can enable location-independent data storage and retrieval. The protocol allows clients to send SCSI commands (referred to as command or (control) data blocks (CDBs) to SCSI storage devices (which may be referred to as targets) on remote servers. iSCSI is a SAN-based protocol, allowing organizations to consolidate storage into data center storage arrays while providing hosts (such as database and web servers) with the illusion of locally attached disks. Unlike traditional Fibre Channel, which uses special-purpose cabling, iSCSI can be run over long distances using existing network infrastructure.

Referring back to FIG. 1B, host system 103 uses an CNA interface 109 to communicate with CNA 111A via a link (not shown, for example, a PCIe link or any other interconnect type). The adaptive aspects disclosed herein are not limited to any particular link type. Each CNA 111 is coupled to a switch 116 port (for example, 120A/120B). Details of CNA 111 are provided below with respect to FIG. 2B.

System 101 also includes a plurality of shared storage sub-systems 121A-121B. The storage subsystems include a processor 113A/113B and a memory 115A/115B. Processor 113A/113B executes firmware instructions out of memory 115A/115B to control the overall operations of the CNAs. The storage subsystem includes storage devices 119A-119N that can be used to store information. Storage devices 119A-119N may include any storage device type, including solid state storage drives (SSDs), hard disk drives, optical drives and others.

Each storage sub-system includes an intelligent storage adapter (ISA) 114A/114B that may be referred to herein as ISA 114 or ISAs 114. ISA 114 may communicate and interface with a mass storage devices 119A-119N. It is noteworthy that storage devices 119A-119N may be accessible directly to ISA 114 or via a SAN.

ISA 114 may be configured to handle both network and storage traffic while interfacing with other elements. In one aspect, as described below in detail, ISA 114A may be configured to provide the functionality of a host bus adapter by providing connectivity to SAN- (storage area network-) based storage arrays as well as present logical storage from a local storage device connected to the ISA.

Storage space at the storage devices (local or SAN-based) is typically presented as a logical entity referred to as a logical unit number (LUN). Each LUN is uniquely identified by an identifier (LUN ID) and is associated with physical storage space. A LUN has a size associated with it that may indicate the amount of storage space that is made available to a computing system and a drive letter that may be used to access the LUN.

A LUN is typically divided into logical block addresses (LBAs) that are used by to read and write data to storage locations. The LBAs are mapped with actual physical storage to read and write data. A LUN used by an application may be referred to as a data LUN.

A LUN that is accessible via a SAN connection may be referred to as a SAN LUN. A LUN at a local storage device managed by ISA 114 and used as a cache may be referred to as cache LUN. A cache LUN may be used to cache data stored at a SAN LUN or another data LUN. The cache LUN is managed by ISA 114 and may not be visible to the host systems.

System 101 may also include the management console 118 that executes the management application 117, used according to one aspect. Management application 117 may be used to configure storage space as logical structures (for example, as LUNs) that are presented for storing information or as cache LUNs for caching information stored at SAN LUNs. Permissions associated with a LUN may also be configured using management application 117. The permissions indicate which entities may be allowed to access a LUN to read and/or write information.

Figure 1C:
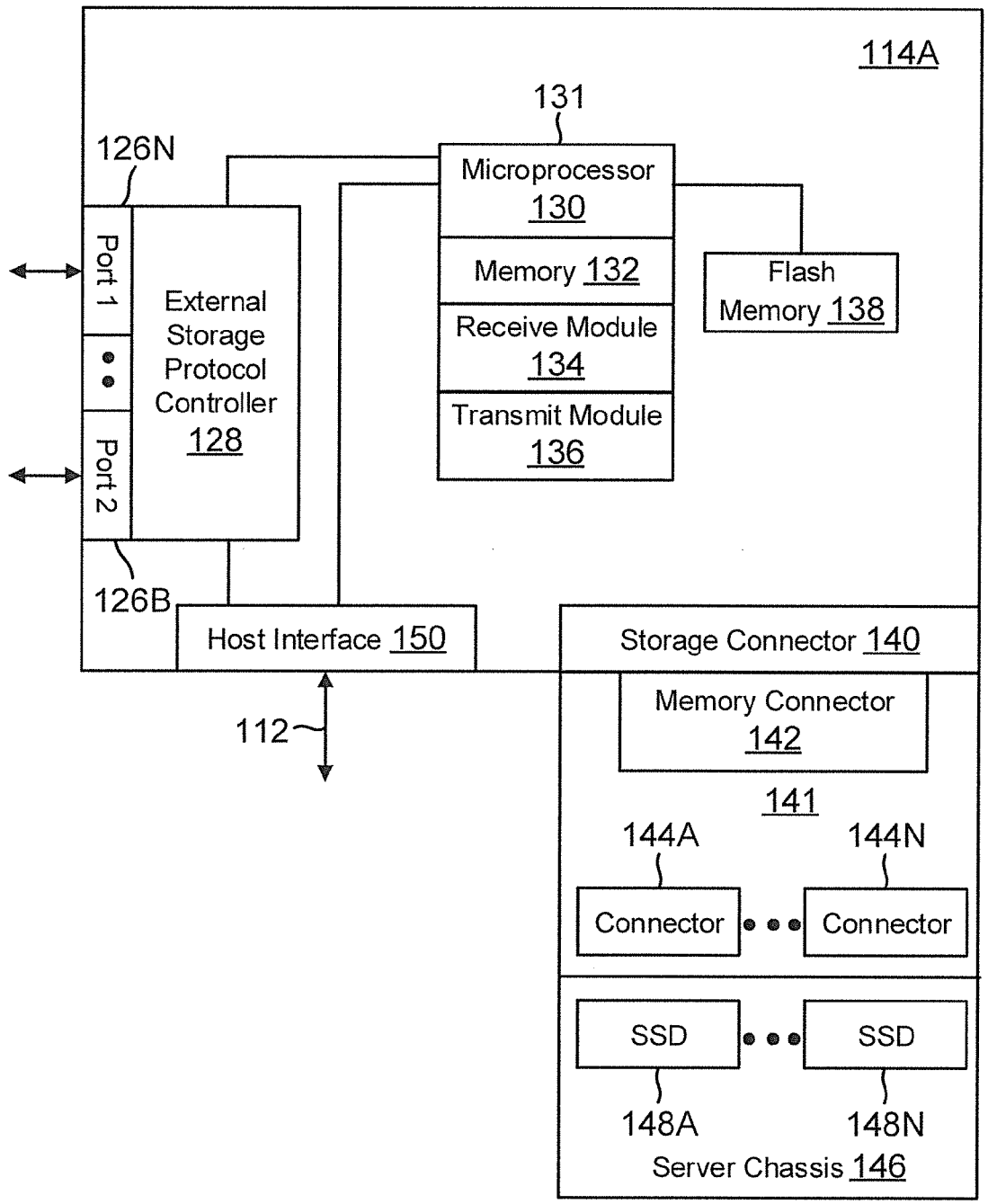
FIG. 1C shows an example of an Intelligent Storage Adapter (ISA), according to one aspect.

FIG. 1C shows an example of ISA 114A that includes an external storage protocol controller 128 (may also be referred to as the "storage protocol controller") with ports 126A and 126B. The storage protocol controller may be a Fibre Channel controller (or application specific integrated circuit (ASIC)) for interfacing with Fibre Channel based storage devices via ports 126A/126B. Ports 126A/126B include logic and circuitry for sending and receiving Fibre Channel frames. Fibre Channel is simply shown as an example and the various aspects disclosed herein are not limited to any particular storage/network protocol. Thus ports 126A-126B are not limited to just Fibre Channel ports. Furthermore, although only two ports 126A and 126B are shown as an example, the adaptive aspects disclosed herein are not limited to any particular number of ports.

Storage protocol controller 128 may operate as a host bus adapter for managing input/output (I/O) requests for SAN-based storage. Storage protocol controller 128 is configured to process I/O requests for reading data from SAN-based storage and writing data to SAN-based storage. Thus storage protocol controller 128 is used to take advantage of existing SAN infrastructure, while providing access to SSDs.

In one aspect, storage protocol controller 128 includes a processor (not shown) or any other hardware type for executing the Fibre Channel stack having layers, FC0-FC3. FC0 is defined by the Fibre Channel specification as the physical layer, which includes cables (fiber optics, twisted-pair), connectors and others. FC1 layer is defined as the data link layer. This layer implements the 8B/10B encoding and decoding of signals. FC2 layer is defined as the network layer. This layer defines the main Fibre Channel framing, addressing, and control protocols. FC3 layer is an auxiliary layer that provides common services like encryption or RAID related. FC4 layer is the protocol mapping layer where other protocols, such as SCSI are encapsulated into an information unit for delivery to FC2 and transmission across a Fibre Channel network. This layer provides flexibility to Fibre Channel as a networking technology compatible with other technologies.

ISA 114A also includes a host interface 150 that interfaces with processor 113A via a link. The structure of host interface 150 will depend on the type of connection/interconnect, for example, if a PCI-Express link is used to communicate with processor 104, then host interface 150 includes logic and circuitry for receiving and sending PCI-Express packets/information.

ISA 114A includes a system on chip (SOC) 131 that includes a processor 130 having access to an adapter memory (which may also be referred to as local memory) 132. Processor 130 may be one or more programmable general-purpose or special-purpose microprocessors, digital signal processors (DSPs), programmable controllers, application specific integrated circuits (ASICs), reduced instruction set computer (RISC), programmable logic devices (PLDs), or the like, or a combination of such hardware devices. Memory 132 may be used to store firmware instructions and various data structures for ISA 114A for controlling overall ISA 114A operations. Memory 132 may also store instructions for implementing the various aspects described herein.

SOC 131 may also include a receive module 134 and a transmit module 136. The receive module 134 may be used to store packets that are received via ports 126A/126B, while transmit module 136 may be used to store information that is transmitted via ports 126A/126B or to local SSDs that are described below. Receive module 134 and/or transmit module 136 may be separate modules and may include more than one component for processing received information or information that is transmitted.

ISA 114A may also include a non-volatile memory 138 (shown as flash memory) for storing parameters/instructions that may be used by processor 130 for executing the instructions described below in detail. ISA 114A also includes a storage connector 140 that interfaces with another card 141 (which may also be referred to as a daughter card 141), according to one aspect. In one aspect, the storage connector may be a PCI-Express connector, PCI connector or any other connector type based on the interconnect used by SOC 131 to interface with the SSDs. The daughter card 141 includes a memory controller 142 that interfaces with a plurality of connectors' 144A-144N. The plurality of connectors' 144A-144N are used to plug in SSDs 148A-148N (similar to storage 119A-119N). In this aspect, SSDs 148A-148N are included within a server chassis 146. In one aspect, connectors' 144A-144N may be SATA connectors for receiving SSDs 148A-148N. In another aspect, connectors' 144A-144N may be SAS connectors.

In another aspect of ISA 114A is configured such that a daughter card has the SSDs 148A-148N on the card itself, rather than on the server chassis 146. In another aspect of ISA 114A is configured such that the memory controller 142 is on the same card as the other components of ISA 114A. Similarly, in an aspect, the SSDs 148A-148N also may be on the same card connected via one or more storage connectors.

Figure 2:
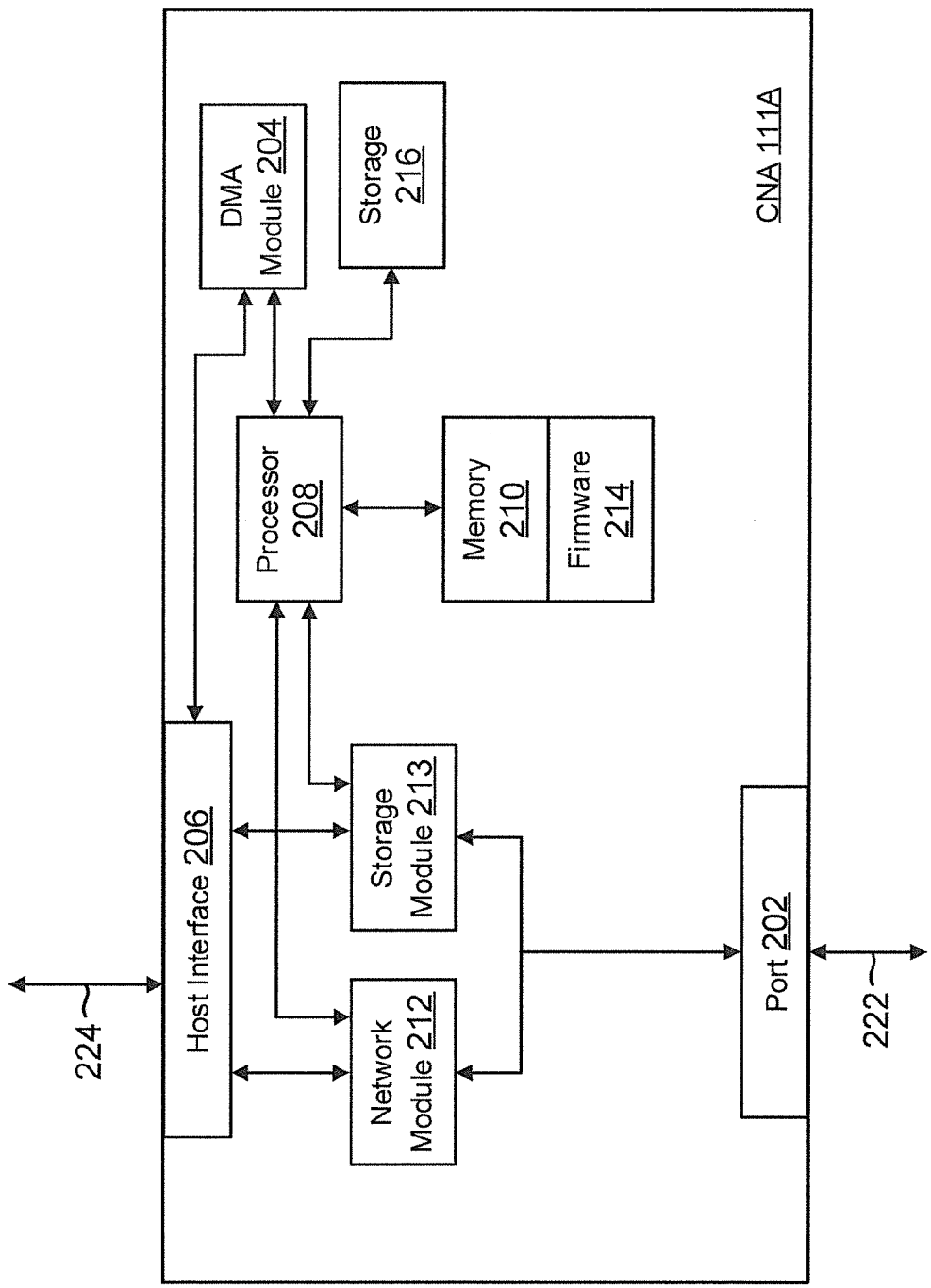
FIG. 2 shows a block diagram of a converged network adapter, used according to one aspect of the present disclosure.

CNA 111A:

Before providing details regarding shared computing, the following describes CNA 111A with respect to FIG. 2 that shows a block diagram of a converged CNA 111A, according to one aspect. CNAs are used in SANs to receive serial data streams (bit stream), align the serial data and then convert it into parallel data for processing. CNAs operate as a transmitting device as well as a receiving device. CNAs are typically used for processing I/O requests for reading and writing information at SAN based storage devices.

CNA 111A interfaces with host system 103A via link 224 and a host interface 206. In one aspect, the host interface 206 may be a PCI Express interface having logic/circuitry for sending and receiving PCI-Express packets, while link 224 is a PCI-Express link. Typically for managing data transfers across link 224, an IOCB (Input/Output Control Block) is first generated and saved at an IOCB queue at a host memory location. The IOCB is obtained by CNA 111A which may be to provide data to a host processor or to send data provided by the host processor.

CNA 111A may include a processor (or more than one processor) 208 that executes firmware instructions 214 out of a memory 210 to control overall. CNA operations. CNA 111A may also include storage 216, which may be for example non-volatile memory, such as flash memory, or any other device. Storage 216 may store executable instructions and operating parameters that can be used for controlling CNA operations.

CNA 111A may also include a network module 212 for handling network traffic via a network link 222. In one aspect, the network module 212 includes logic and circuitry for handling network packets, for example, Ethernet or any other type of network packets. The network module 212 may include memory buffers (not shown) to temporarily store information received from and transmitted to other network devices.

CNA 111A may also include a storage module 213 for handling storage traffic to and from storage devices. The storage module 213 may further include memory buffers (not shown) to temporarily store information received from other storage devices. In one aspect, the storage module 213 is configured to process storage traffic according to the Fibre Channel storage protocol, or any other protocol. It is noteworthy that CNA 111A may only have a storage module 213 and the aspects described herein are not limited to any particular CNA type.

CNA 111 also includes a port (or interface) 202 that interfaces with link 222. Port 202 includes logic and circuitry to receive information via the network link 222 and pass it to either the network module 212 or the storage module 213, depending on the packet type.

CNA 111 also includes a direct memory access (DMA) module 204 that is used to manage access to link 224. The DMA module 204 uses a plurality of DMA channels for transferring data via link 224. The DMA channels are typically used to move control structures such as input/output control blocks (IOCBs), input/output status blocks (IOSBs) and data between a host system memory and memory 210.

Figure 3A:
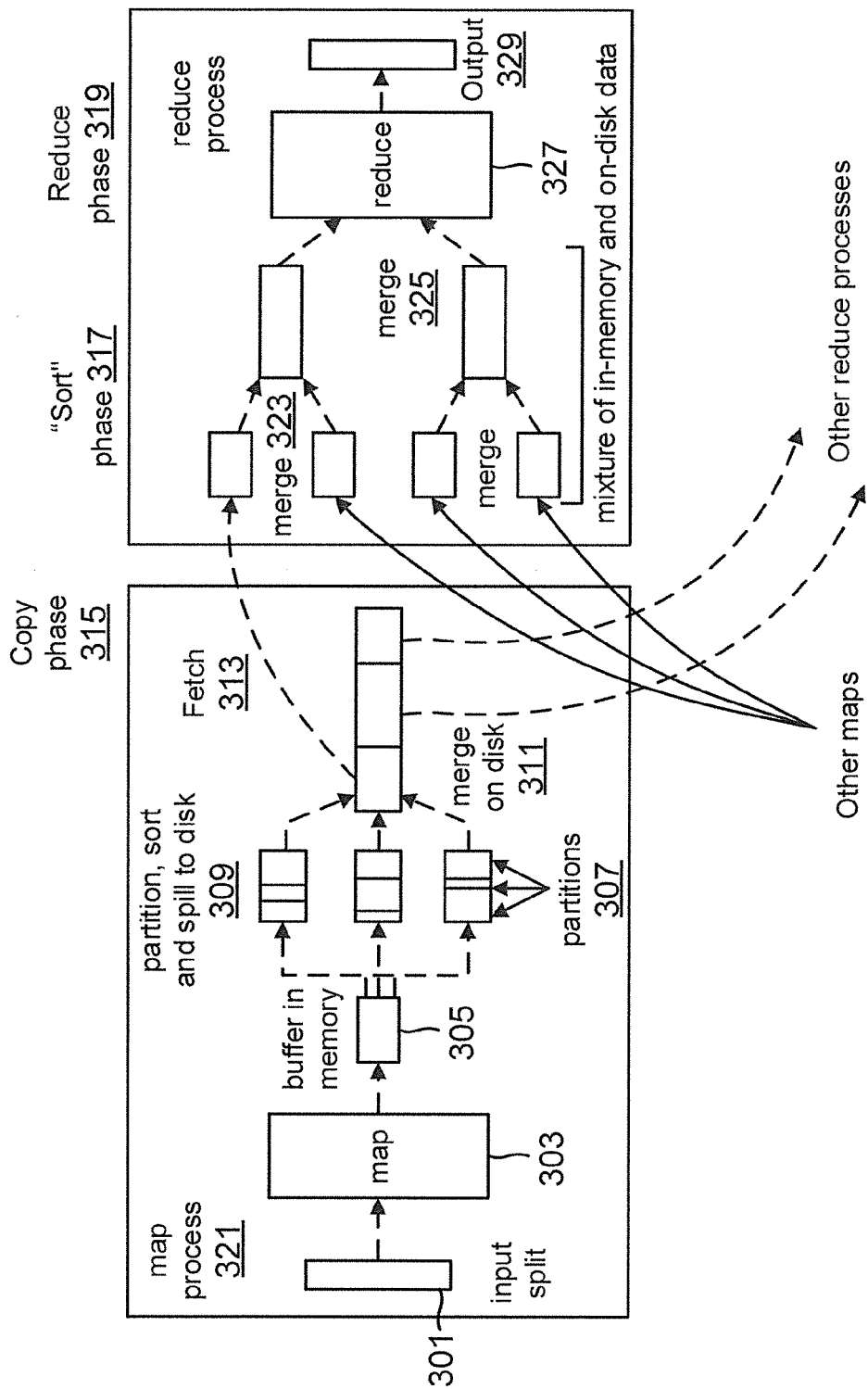
FIG. 3A shows a conventional cluster computing process.

FIG. 3A shows an example of different processes that are used for completing a shared computing task. These processes are used in an Apache Hadoop environment but are relevant for other architectures as well. The various tasks are executed by each computing node. Mapping process 321 is comprised of various sub-tasks. For example, an input 301 provided by an application is received by a mapping process that generates intermediate data. The intermediate data is then stored at a buffer 305 at a computing system memory. The data in the buffer is partitioned (307), sorted and then stored to a local storage device (309). From the local storage device, the data is fetched (313) for a copy and sort phase (315 and 317). The copy phase is also referred to as a shuffle phase and the sort phase is also referred to as a merge phase. The fetched data is merged (shown as 323 and 325) and then reduced (327) during the reduce phase 319. The reduce process 327 provides an output 329 that can be used for a specific computing objective.

Figure 3B:
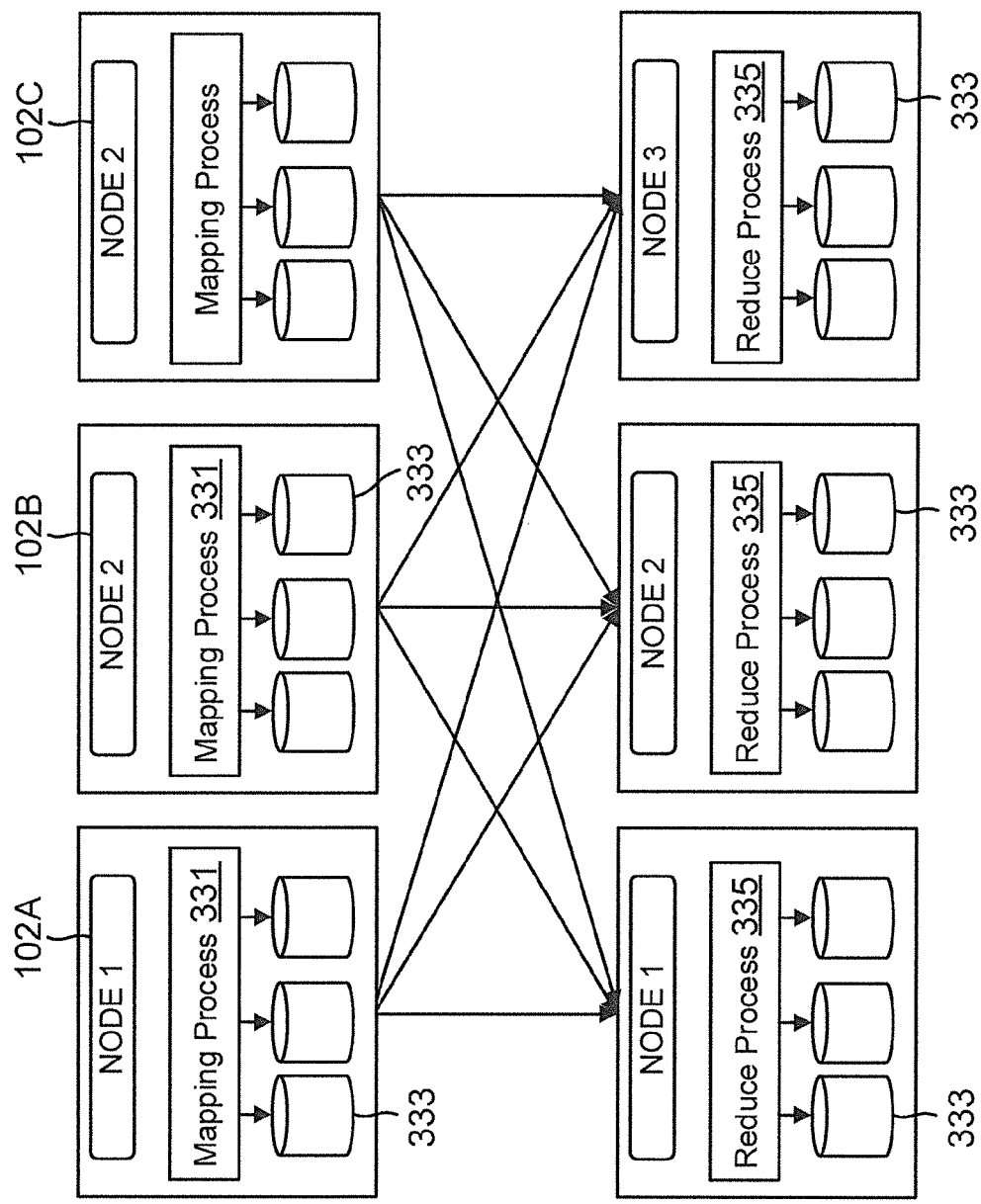
FIG. 3B shows a conventional architecture for cluster computing.

FIG. 3B shows an example of a conventional architecture that is used to execute the various process blocks of FIG. 3A. Nodes 102A-102C each execute the mapping process 333 and the reduce process 335. These processes may be executed by a processor executing instructions out of a memory. The mapping process 331 executed by each node generates intermediate data and the intermediate data is stored at a local storage drive 333 (similar to 108A/108N). Typically, there are multiple accesses to the local storage drive for generating the intermediate data by the mapping process. The various arrows show that intermediate data from each node is provided to other nodes for the reduce process 335. Various local storage disk read and write access have to be performed to execute the process blocks of FIG. 3A. The different processes of FIG. 3A/3B require partitioning, sorting and accessing the intermediate data from the local storage of each computer node. As described above, this is inefficient.

Figure 3C:
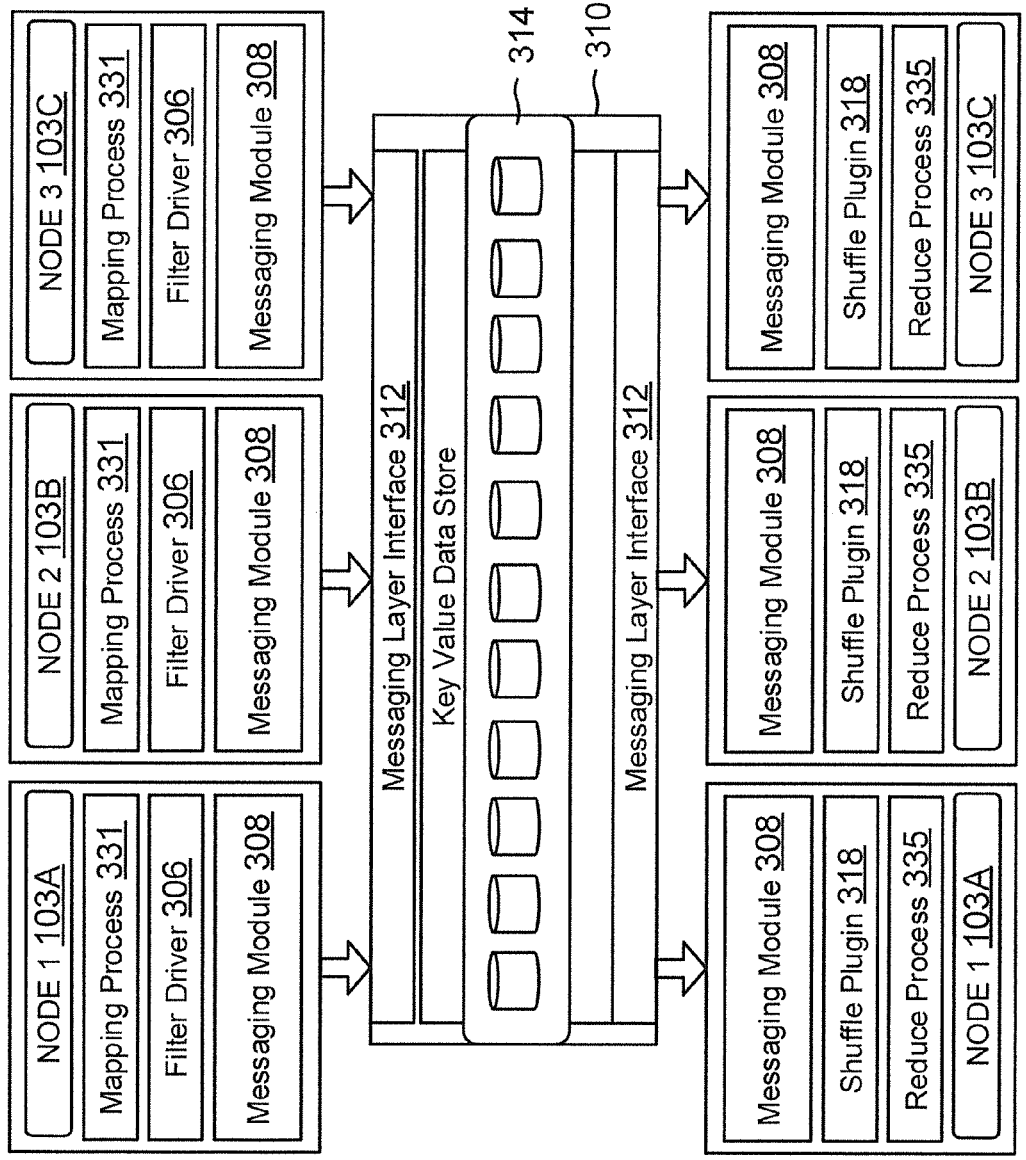
FIG. 3C shows an architectural block diagram of a system for clustered computing, according to one aspect of the present disclosure.

FIG. 3C shows an architecture 300 that can be used according to one aspect of the present disclosure. Architecture 300 shows nodes 103A-103C that each execute the mapping process 331 and the reduce process 335. As an example, the mapping process 331 generates intermediate data. This intermediate data is handled by a filter driver 306 that provides the intermediate data to a messaging module 308. The messaging module 308 formats the intermediate data and provides it to a messaging layer interface 312 for storage at a module 310. As an example, module 310 is executed at storage sub-system 121A-121N. Portions of module 310 may be executed by processor 113, ISA 114 and the storage devices 119A-119N.

Message layer interface 312 stores the intermediate data at a key-value store 314. In one aspect, the key value store 314 is a key value database that can be searched using key value pairs. The key-value pair search mechanism allows a fast retrieval of stored intermediate data.

Message module 308 may also be used to retrieve data from the key value store 314 for the reduce process. A shuffle-plug-in module (shown as shuffle plugin) 318 is executed by each node to interface with the message module 308 and the reduce process 335. The shuffle plug-in 318 receives the intermediate data from the message module 308 and then provides it on demand to the reduce process 335. The reduce process 335 consume the intermediate data to provide the output 329 (FIG. 3A).

In more detail, filter driver 306 may be implemented with a tunable pattern matcher and a buffer cache (not shown) that can store data in a DRAM or a flash memory. Filter driver 306 captures any storage device access request from an application 105 and then uses the pattern matcher to identify the access type. Based on the match, the access may be assigned a caching level priority and assigned a suitable buffer from the buffer cache (similar to buffer 305).

Intermediate data designated for use during the shuffle process is identified by the pattern matcher and then assigned a key. Using the key, the intermediate data is moved to the key-value store 314 via the messaging module 308 and message layer interface 312. This key-value can be used to retrieve the data by a receiving node. It is noteworthy that the intermediate data is stored using a disaggregated storage platform using an on-demand messaging framework.

In one aspect, the re-direction and modification of the intermediate data may be achieved using a plug-in application, for example, a Shuffle Plug-in 318. As an example, the shuffle plug-in may be an Apache Hadoop Shuffle plug-in module. The website http://Hadoop.apache.org/docs/current/ provides information regarding Hadoop architecture. The current Hadoop version is 2.6x. The shuffle plugin is available at apache.org. The shuffle plug-in retrieves the intermediate data based on demand using the message module 308 and the message layer interface 312.

In one aspect, the intermediate data is written to a storage device once and read from the storage device during the merge process. However, since disaggregated storage devices may use multiple levels of caching, some of the intermediate data may never be written to a storage device. This improves performance of parallel computing.

In one aspect, having disaggregated and distributed shared storage, enables compute nodes and storage to be managed and scaled separately. Expensive storage resources are pooled for efficient use within the cluster framework. By separating storage resources from the computing systems allows independent scalability of storage and compute platforms, for example, snapshots, data migrations, replication and caching with better efficiency and well tested processed.

Figure 4:
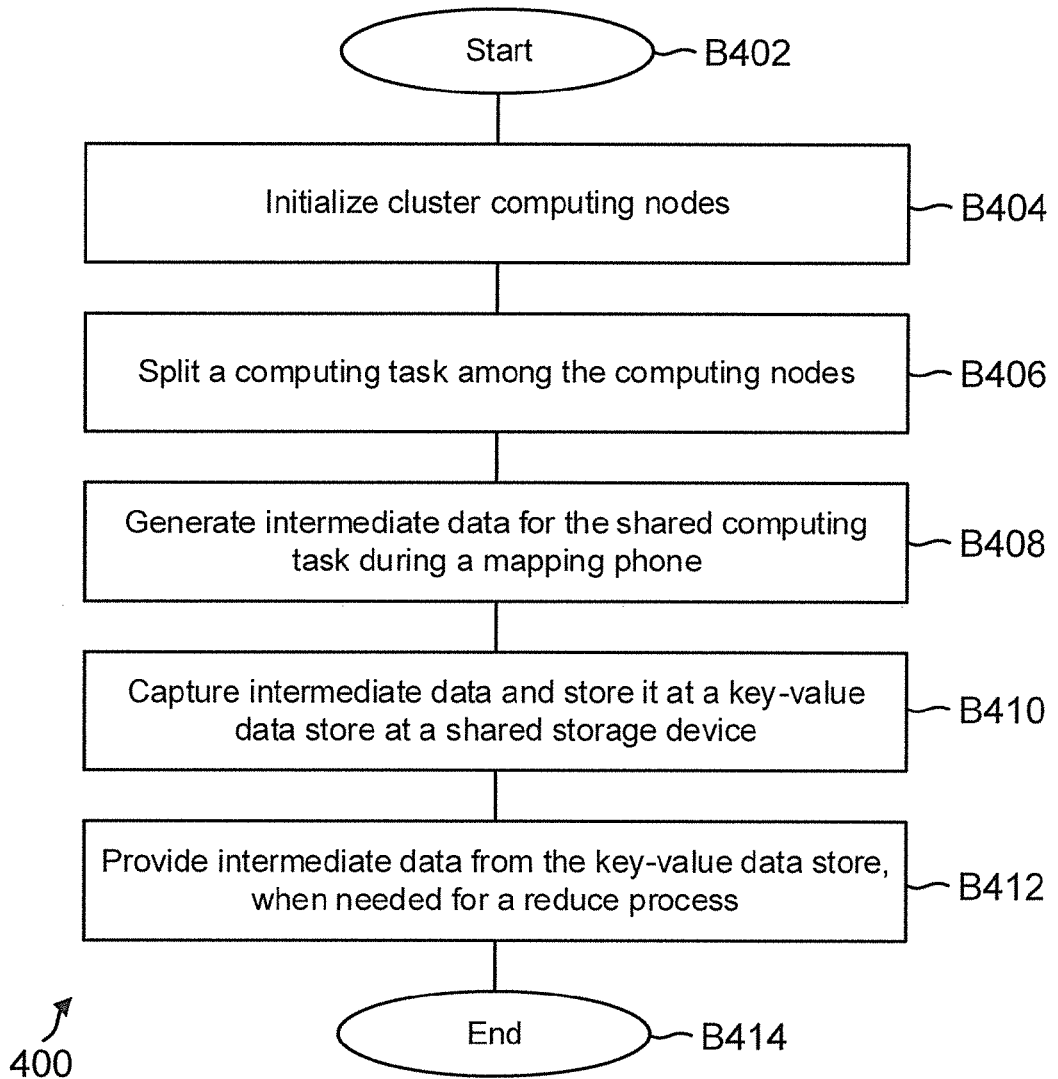
FIG. 4 a show process flow diagram for clustered computing, according to one aspect of the present disclosure.

FIG. 4 shows a process 400 for executing the various cluster computing process blocks using the system of FIG. 3C, according to one aspect. The process begins in block B402. In block B404, a plurality of cluster nodes are initialized and are operational.

In block B406, a computing task is sub-divided into a certain number of sub-tasks (for example, X). In block B408, application 105 executed at each node executes the task and generates intermediate data. In block B410, filter driver 306 captures the data and sends the data to shared storage via message module 308. When the data is needed by the reduce process 335, the shuffle plug-in 318 obtains the data as needed from the message layer interface 312. In one aspect, a key-value pair is used to search for data stored at the key-value data store 314. The key-value pair may be customized for different tasks and operating environments. Thereafter, the process ends in block B414.

As described above, intermediate data is stored at a shared storage and can be efficiently obtained executing a key-value search. One does not have to access local nodes numerous times to share the intermediate data.

Although the present disclosure has been described with reference to specific aspects, these aspects are illustrative only and not limiting. For example, although the description above has been described with respect to an ISA, any other device may be configured to perform the foregoing function. Thus the term adapter and device are interchangeable. Many other applications and aspects of the present disclosure will be apparent in light of this disclosure and the following claims. References throughout this specification to "one aspect" or "an aspect" means that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

What is claimed is:

1. A machine implemented method, comprising:
configuring a shared computing task among a plurality of computing nodes each computing node executing an application for performing the shared computing task;
generating intermediate data by each of the plurality of computing nodes during a mapping process for performing the shared computing task;
capturing the intermediate data for each of the plurality of computing nodes and transferring the intermediate data of each of the plurality of computing nodes to a shared storage device;
storing the intermediate data for each of the plurality of computing nodes at a key-value data store at the shared storage device that enables searching for the intermediate data of any node at the shared storage device using a key-value pair; and
using the key-value pair to obtain the intermediate data from the shared storage device when needed for a reduce process of the shared computing task; wherein the mapping process and the reduce process are executed by a processor coupled to a memory device.

2. The method of claim 1, wherein a filter driver executed by each of the computing node interfaces with the mapping process to capture the intermediate data generated by its node and sends the intermediate data to a message module for sending it to the shared storage device.

3. The method of claim 2, wherein a shuffle plugin module executed by the processor obtains the intermediate data from the shared storage using the key-value pair and provides the intermediate data to the reduce process, when needed.

4. The method of claim 1, wherein the plurality of computing nodes operate within a Hadoop architecture for executing the shared computing task.

5. The method of claim 1, wherein each computing node interfaces with a converged network adapter that processes both network and storage traffic to transfer the intermediate data to the shared storage.

6. The method of claim 1, wherein the shared storage is managed by an intelligent storage adapter that can access the shared storage and other storage via a storage area network.

7. The method of claim 6, wherein the intelligent storage adapter has access to a solid state storage device for storing the intermediate data.

8. A non-transitory, machine readable storage medium having stored thereon instructions for performing a method, comprising machine executable code which when executed by at least one machine, causes the machine to:
configure a shared computing task among a plurality of computing nodes each computing node executes an application for performing the shared computing task;
generate intermediate data by each of the plurality of computing nodes during a mapping process for performing the shared computing task;
capture the intermediate data for each of the plurality of computing nodes and transfer the intermediate data of each of the plurality of computing nodes to a shared storage device;
store the intermediate data for each of the plurality of computing nodes at a key-value data store at the shared storage device that enables searching for the intermediate data of any node at the shared storage device using a key-value pair; and
use the key-value pair to obtain the intermediate data from the shared storage device when needed for a reduce process of the shared computing task; wherein the mapping process and the reduce process are executed by a processor coupled to a memory device.

9. The non-transitory, storage medium of claim 8, wherein a filter driver executed by each of the computing node interfaces with the mapping process to capture the intermediate data and sends the intermediate data to a message module for sending it to the shared storage device.

10. The non-transitory, storage medium of claim 9, wherein a shuffle plugin module executed by the processor obtains the intermediate data from the shared storage using the key-value pair and provides the intermediate data to the reduce process, when needed.

11. The non-transitory, storage medium of claim 8, wherein the plurality of computing nodes operate within a Hadoop architecture for executing the shared computing task.

12. The non-transitory, storage medium of claim 8, wherein each computing node interfaces with a converged network adapter that processes both network and storage traffic to transfer the intermediate data to the shared storage.

13. The non-transitory, storage medium of claim 8, wherein the shared storage is managed by an intelligent storage adapter that can access the shared storage and other storage via a storage area network.

14. The non-transitory, storage medium of claim 13, wherein the intelligent storage adapter has access to a solid state storage device for storing the intermediate data.

15. A system, comprising:
a memory containing machine readable medium comprising machine executable code having stored thereon instructions; and
a processor module coupled to the memory, the processor module configured to execute the machine executable code to:
configure a shared computing task among a plurality of computing nodes each computing node executes an application for performing the shared computing task;
generate intermediate data by each of the plurality of computing nodes during a mapping process for performing the shared computing task;
capture the intermediate data for each of the plurality of computing nodes and transfer the intermediate data of each of the plurality of computing nodes to a shared storage device;
store the intermediate data for each of the plurality of computing nodes at a key-value data store at the shared storage device that enables searching for the intermediate data of any node at the shared storage device using a key-value pair; and
use the key-value pair to obtain the intermediate data from the shared storage device when needed for a reduce process of the shared computing task; wherein the mapping process and the reduce process are executed by a processor coupled to a memory device.

16. The system of claim 15, wherein a filter driver executed by each of the computing node interfaces with the mapping process to capture the intermediate data and sends the intermediate data to a message module for sending it to the shared storage device.

17. The system of claim 16, wherein a shuffle plugin module executed by the processor obtains the intermediate data from the shared storage using the key-value pair and provides the intermediate data to the reduce process, when needed.

18. The system of claim 15, wherein the plurality of computing nodes operate within a Hadoop architecture for executing the shared computing task.

19. The system of claim 15, wherein each computing node interfaces with a converged network adapter that processes both network and storage traffic to transfer the intermediate data to the shared storage.

20. The system of claim 15, wherein the shared storage is managed by an intelligent storage adapter that can access the shared storage and other storage via a storage area network.

\* \* \* \* \*